United States Patent [19]

Gitzendanner

[11] 4,011,589
[45] Mar. 8, 1977

[54] SPINDLE LOCK SHAFT FOR DISK DRIVE MEDIA

[75] Inventor: Louis G. Gitzendanner, Oklahoma City, Okla.

[73] Assignee: Honeywell Information Systems, Inc., Waltham, Mass.

[22] Filed: Jan. 23, 1976

[21] Appl. No.: 651,677

Related U.S. Application Data

[63] Continuation of Ser. No. 474,575, May 30, 1974, abandoned.

[52] U.S. Cl. .................... 360/98; 64/2 R; 64/1 V; 346/137
[51] Int. Cl.² .......... G11B 5/012; G01D 15/16; F16C 1/02
[58] Field of Search ............... 360/97–99; 346/137; 64/2 R, 1 V; 274/39 A

[56] References Cited

UNITED STATES PATENTS

| 3,670,315 | 6/1972 | Fowler | 360/97 |
| 3,706,085 | 12/1972 | Mowrey et al. | 360/97 |

*Primary Examiner*—Robert S. Tupper
*Attorney, Agent, or Firm*—William F. White; Ronald T. Reiling

[57] ABSTRACT

An improved spring-loaded spindle lock shaft for disk drive media to prevent introducing eccentricity in a disk pack when the pack is attached to a motor driven spindle and is rotated thereby.

4 Claims, 7 Drawing Figures

U.S. Patent  Mar. 8, 1977  Sheet 1 of 2  4,011,589
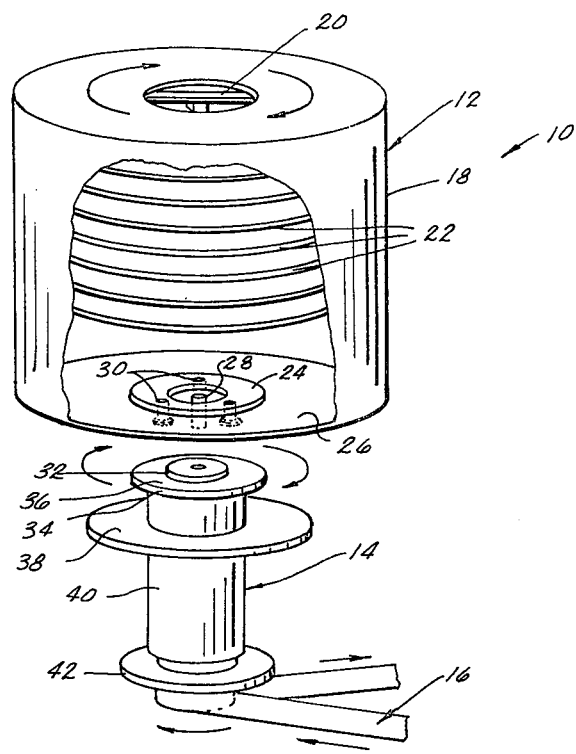
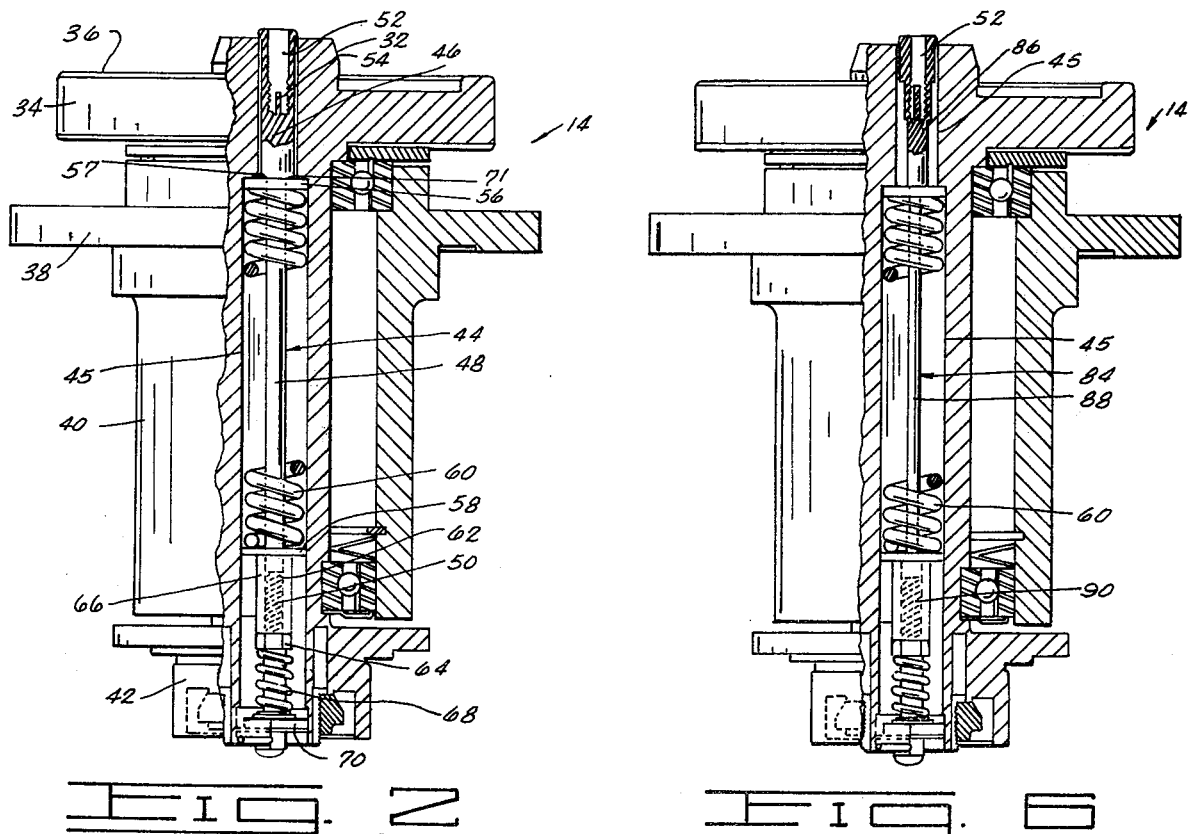

SPINDLE LOCK SHAFT FOR DISK DRIVE MEDIA

This is a continuation, of application Ser. No. 474,575, filed May 30, 1974, now abandoned.

BACKGROUND OF THE INVENTION

This invention relates generally to improvements in a motor driven spindle for driving a disk pack and more particularly, but not by way of limitation, to an improved spring-loaded spindle lock shaft.

In a prior art disk drive apparatus, a disk pack includes a mounting plate attached to the bottom of the pack. The mounting plate has associated with it a threaded screw which is threaded inside the top of a spring-loaded spindle lock shaft. The shaft is disposed inside the center portion of a spindle. When the mounting plate is secured to the spindle, a pin inside the shaft trips an interlock system in the pack allowing a disk pack cover to be removed. The apparatus is then ready for operation.

It has been found that even though the interlock system may be tripped, the mounting plate may not be securely tightened inside the shaft. When this occurs, due to unavoidable tolerances in the threading of the screw and threaded bore of the shaft, the threads allow play which is sufficient to cause torque forces at an angle to the normally concentric axis of the disk pack and spindle. Because the shaft is rigid, it does not compensate for these torque forces. Consequently, distortion occurs in the mounting plate producing eccentricity of the disk pack as the pack is rotated on the spindle. Often the disk drive servo system does not have a high enough frequency response to accurately follow the eccentricity of the disk pack.

Also, the top of the shaft and the base of the threaded screw may contain slight machine imperfections. These imperfections, although small and often undetected during maching inspections, are large enough to cause torque forces when the base is tightened against the top of the shaft. These torque forces are at an angle to the concentric axis of the pack and the shaft. Again, because the shaft is rigid, distortion occurs in the mounting plate producing eccentricity of the disk pack.

SUMMARY OF THE INVENTION

The above mentioned problems are solved by an improved spring-loaded spindle lock shaft which is designed to be flexurally weak thereby allowing distortion in the shaft rather than in the mounting plate.

The present invention incluses a disk drive apparatus having a disk pack with its axis through a center portion thereof. A mounting plate is secured to a bottom portion of the disk pack and is an integral part thereof. A threaded screw is associated with the mounting plate and is threaded into a top portion of a motor driven spindle. The spindle has an axis through a center portion thereof and is concentric with the axis of the disk pack. The spindle includes an improved spring-loaded spindle lock shaft disposed within the center portion of the spindle. When the shaft is secured to the mounting plate, the shaft being flexurally weak is distorted when torque forces develop at an angle to the axis of the shaft.

The advantages and objects of the invention will be evident from the following detailed description, when read in conjunction with the accompanying drawings, which illustrate a preferred embodiment of the invention.

BRIEF DESCRIPTION OF THE DRAWINGS

FIG. 1 is a perspective view of the disk drive apparatus.

FIG. 2 is a cross-sectional view of the motor driven spindle with a prior art spring-loaded spindle lock shaft.

FIG. 6 is a cross-sectional view of the motor driven spindle with an improved spring-loaded spindle lock shaft.

DETAILED DESCRIPTION OF THE PREFERRED EMBODIMENT

Figure 3:
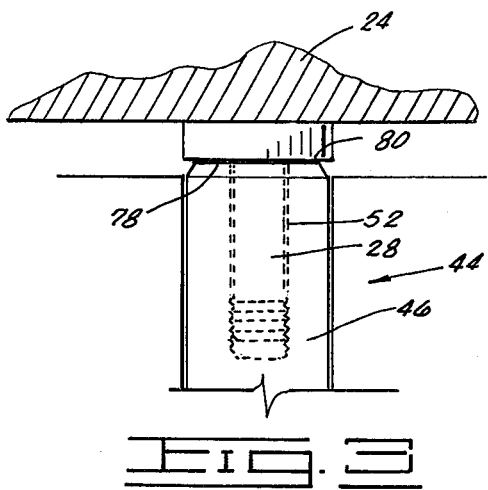
FIG. 3, 4, and 5 are cross-sectional views of a portion of the mounting plate and a portion of a prior art spring-loaded spindle lock shaft.

In FIG. 1 the disk drive apparatus is designated by the general reference character 10. The apparatus 10 includes a disk pack 12, a spindle 14, a pulley belt 16, and a motor, which is not shown, for driving the pulley belt 16.

The disk pack 12 includes a disk pack cover 18, having a handle 20, disks 22, a mounting plate 24, a bottom disk 26, and a threaded screw 28. The disk pack 12 is secured to the spindle 14 by centering the pack 12 over the spindle 14 and turning the handle 20 in a clockwise direction threading the screw 28 into the spindle 14. When the pack 12 is secured, an interlocking system which is not shown, is tripped and the disk pack cover 18 can be removed.

The mounting plate 24 includes the threaded screw 28 which extends outwardly therefrom for engaging the spindle 14. Attached to the outer circumference of the mounting plate 24 are bearing buttons 30.

The top of the spindle 14 includes a protuberance 32 to aid in centering and securing the pack 12 to the spindle 14. Adjacent to the protuberance is a flanged plate 34 having a bearing surface 36 which is disposed against the buttons 30 when the plate 24 is secured to the spindle 14. A spindle base plate 38 is used to attach the spindle 14 to an assembly base plate, which is not shown. The spindle 14 further includes a housing 40 and a spindle pulley 42 attached to a pulley belt 16.

Referring now to FIG. 2, a prior art spring-loaded spindle lock shaft 44 is disposed inside a shaft housing 45 having a hollow interior chamber as shown. The shaft 44 includes a top portion 46, a mid portion 48, and a bottom portion 50.

The top portion 46 has a threaded bore 52 for receiving the threaded screw 28, shown in FIG. 1. At the bottom of the bore 52 is a pin 54 which when contacted by the threaded screw 28 trips the interlock system.

The mid portion 48 includes an upper washer 56, a lower washer 58 and a spring 60. The spring 60 which actually extends the full length of the mid portion of the shaft, is shown in a cutaway view to illustrate the standard size of the shaft 44. The bottom portion 50 includes an adjusting bushing 66, an adjusting nut 64, a threaded portion 62 on the surface of the bottom portion 50, a positioning spring 68, and a positioning bushing 70. The positioning spring 68 is used to bias shaft 44 upward so that the shaft may be easily engaged by the threaded screw 28. The positioning bushing 70 is used to radially align the bottom portion 50 inside the housing 45.

The spring 60 is held in compression between washer 56 bearing against a flanged portion 57 of the shaft 44 and the lower washer 58 bearing against bushing 66. The amount of compression on the spring 60 is determined by adjusting the adjusting nut 64 on the threaded portion 62. The compressive force of the spring 60 is of importance when the threaded screw 28 is threaded inside bore 52. When the threading occurs, the shaft 14 is urged upwardly further compressing spring 60 against a flanged portion 71 of the housing 45. The compressive force causes an axial load along the concentric axis of the shaft 44 which urges the mounting plate 28 toward the bearing surface 36 of the spindle 14.

Figure 4:
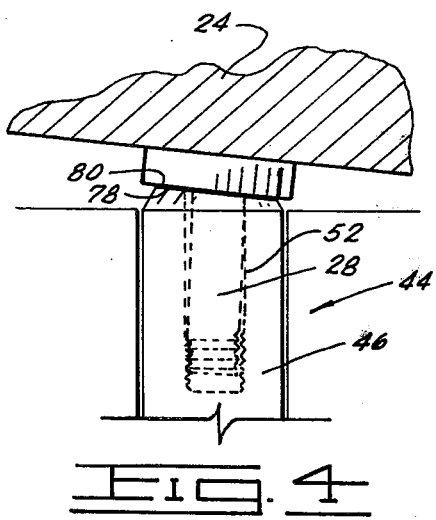
Figure 5:
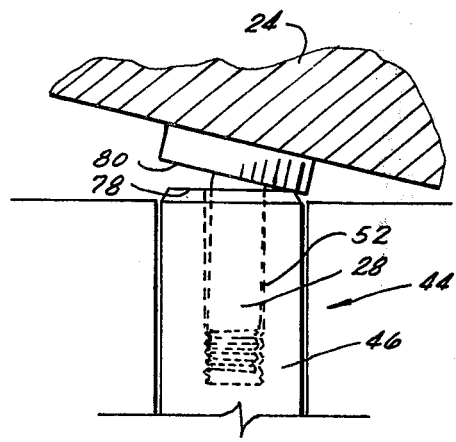

FIG. 3, 4, and 5 show a top portion 78 of the shaft 44 bearing against a base 80 of the threaded screw 28. These views are greatly enlarged and exaggerated to show more clearly and in detail the problem of distortion in the mounting plate 24.

FIG. 3 illustrates the proper alignment between the mounting plate 24 and the shaft 44. The base 80 is substantially parallel to the top portion 78, and the threaded screw 28 is securely positioned inside threaded bore 52. In this example, the axis of both the spindle 14 and the disk pack 12 are concentric.

In FIG. 4 the top portion 78 is shown with the bearing surface at an angle to the base 80. This angle is caused by imperfections in the machining of the top portion 78. When the base 80 and the top portion 78 are securely tightened against each other, torque forces at an angle to the axis of the spindle 14 and the disk pack 12 are developed causing distortion in the mounting plate 24. The distortion occuring in an area centered on the base 80 and extending outwardly toward the bearing buttons 30. While the buttons 30 hold the pack 12 generally parallel to the bearing surface 36 of the spindle 14, the distortion of the plate 24 near the base 80 is sufficient to shift the pack 12 radially, resulting in eccentricity when the pack 12 is rotated.

It should be mentioned that due to poor machining the base 80 may also be at an angle to the top portion 78 causing similar distortions in the mounting plate 24. Also, the screw 28 may not be at a right angle to base 80 again causing distortion in the mounting plate 24.

FIG. 5 shows the same distortion in the mounting plate 24, as shown in FIG. 4. But this time the distortion is caused by failing to adequately tighten the threaded screw 28 inside the threaded bore 52. Because there are unavoidable tolerances in the standard threading used in the machining of the threads, the base 30 is tilted at an angle to the end portion 78 resulting again in torque forces at an angle to the axis of the disk pack 12 and the spindle 14 thereby distorting the mounting plate 28.

FIG. 6 is a similar cross-sectional view of the spindle 14, shown in FIG. 2, but includes an improved spring-loaded spindle lock shaft 84. A top portion 86 of the shaft 84 is tapered inwardly toward a mid portion 88. The taper is to provide clearance between the shaft 84 and the shaft housing 45 when the shaft 84 is distorted. The mid portion 88 of the shaft 84 is shown with an overall reduced diameter as compared to the mid portion 48 of the prior art shaft 44, shown in FIG. 2. A bottom portion 90 on the shaft 84 is substantially the same as the bottom portion 50 of the shaft 44.

Figure 7:
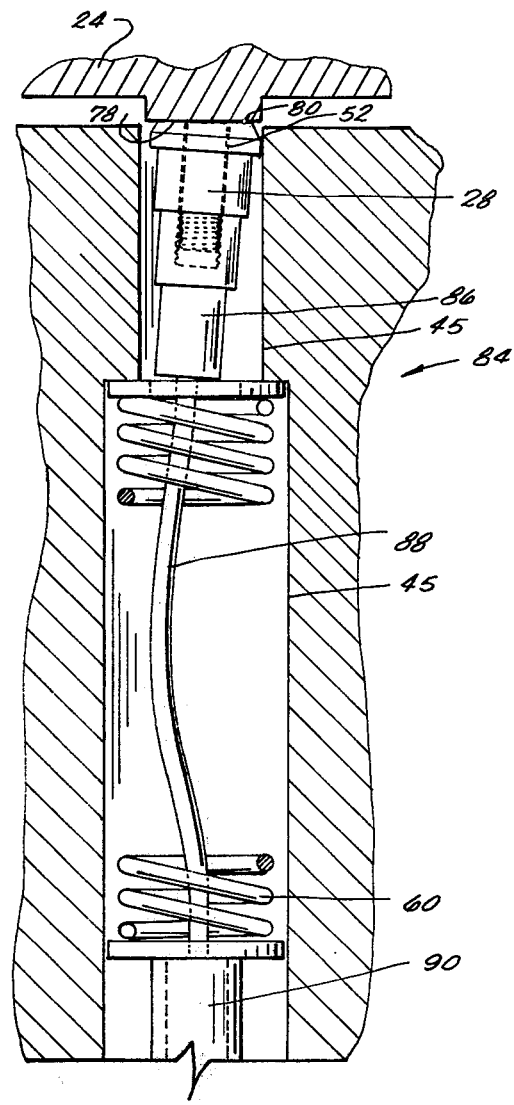
FIG. 7 is a cross-sectional view of the improved spring-loaded spindle lock shaft attached to the mounting plate.

Shown in FIG. 7 is the improved shaft 84 illustrating how the flexible mid portion 88 is distorted. In this figure, the top portion 78 is shown with a bearing surface at an angle to the base 80. When the mounting plate 24 is tightly secured against the top of the spindle 14, torque forces at an angle to the axis of the spindle 14 and the disk pack 12 are developed. The improved shaft, being flexurally weak, limits the magnitude of these torsional forces caused by the misalignment. These forces are transmitted to the shaft 84 and distortion occurs primarily in the shaft rather than in the area of the mounting plate 24 bounded by the bearing buttons 30.

Changes may be made in the construction and arrangement of the parts or elements of the various embodiments as disclosed herein without departing from the spirit and scope of the invention as defined in the following claims.

What is claimed is:

1. In a disk drive apparatus having a disk pack with a motor driven spindle for rotating the disk pack, said disk pack including a mounting plate located at the bottom thereof and bearing upon the top of said motor driven spindle, said motor driven spindle comprising:
a spindle housing having a hollow interior chamber with an inwardly extending flanged portion at the top thereof;
a shaft disposed within the hollow interior chamber of said spindle housing and secured to the mounting plate, said shaft having a top portion, a bottom portion and a mid portion, the mid portion having a diameter smaller than the top portion and the bottom portion; and
means for spring loading said shaft within the hollow interior chamber of said spindle housing, said spring-loading means comprising:
a first spring extending along the length of only the mid portion of said shaft, said first spring being compressibly loaded against the inwardly extending flanged portion at the top of the hollow interior chamber of said spindle housing so as to bias said shaft downwardly,
a second spring extending over only the bottom portion of said shaft, said second spring compressibly loaded against the bottom of the hollow interior of said spindle housing so as to bias said shaft upwardly, and
means, located at the bottom of said first spring and the top of said second spring, for compressible loading said first and second springs within the hollow interior chamber of said spindle housing.

2. The apparatus of claim 1 further comprising:
means at opposite longitudinal extremes of the mid portion of said shaft for positioning said mid portion within the hollow chamber of said spindle housing, said positioning means being held in place at either longitudinal extreme of the mid portion of said spindle housing by said first spring.

3. The disk apparatus of claim 1 wherein said compressibly loading means comprises:
means for adjusting the compression of said first and second springs, said adjusting means being located between said first spring and said second spring.

4. The apparatus as defined in claim 1 wherein the top portion of said shaft is located within the inwardly extending flanged portion of the hollow interior of said spindle housing and the circumference of the top portion of said shaft is tapered inwardly over substantially its entire length towards the mid portion of said shaft so as to provide clearance between the inwardly extending flanged portion of the hollow interior chamber of said spindle housing and the top portion of said shaft when said shaft is distorted.

* * * * *